United States Patent [19]

Kotajima

[11] Patent Number: 4,915,191
[45] Date of Patent: Apr. 10, 1990

[54] TRANSFER DEVICE FOR A FOUR-WHEEL DRIVE VEHICLE

[75] Inventor: Takao Kotajima, Tokyo, Japan

[73] Assignee: Fuji Jukogyo Kabushiki Kaisha, Tokyo, Japan

[21] Appl. No.: 271,038

[22] Filed: Nov. 14, 1988

[30] Foreign Application Priority Data

Dec. 16, 1987 [JP] Japan .......................... 62-190965[U]

[51] Int. Cl.⁴ ..................... B60K 17/344; B60K 17/35
[52] U.S. Cl. .................................... 180/248; 180/250; 475/221
[58] Field of Search ............... 74/710.5, 711; 180/233, 180/248, 249, 250

[56] References Cited

U.S. PATENT DOCUMENTS 2,228,581  1/1941  Olen ............................... 180/250 X

FOREIGN PATENT DOCUMENTS 61-170747 10/1986 Japan .
112223  5/1988 Japan .................................. 180/249

Primary Examiner—Mitchell J. Hill
Attorney, Agent, or Firm—Martin A. Farber

[57] ABSTRACT

A transfer device for a four-wheel drive vehicle has a transfer shaft rotatably mounted by first and second bearings and a transfer gear rotatably mounted on the transfer shaft between the bearings. A coupling device is provided outside the first bearing for engaging the transfer gear with the transfer shaft, and a bevel gear is secured to the transfer shaft at a portion outside of the second bearing.

5 Claims, 1 Drawing Sheet

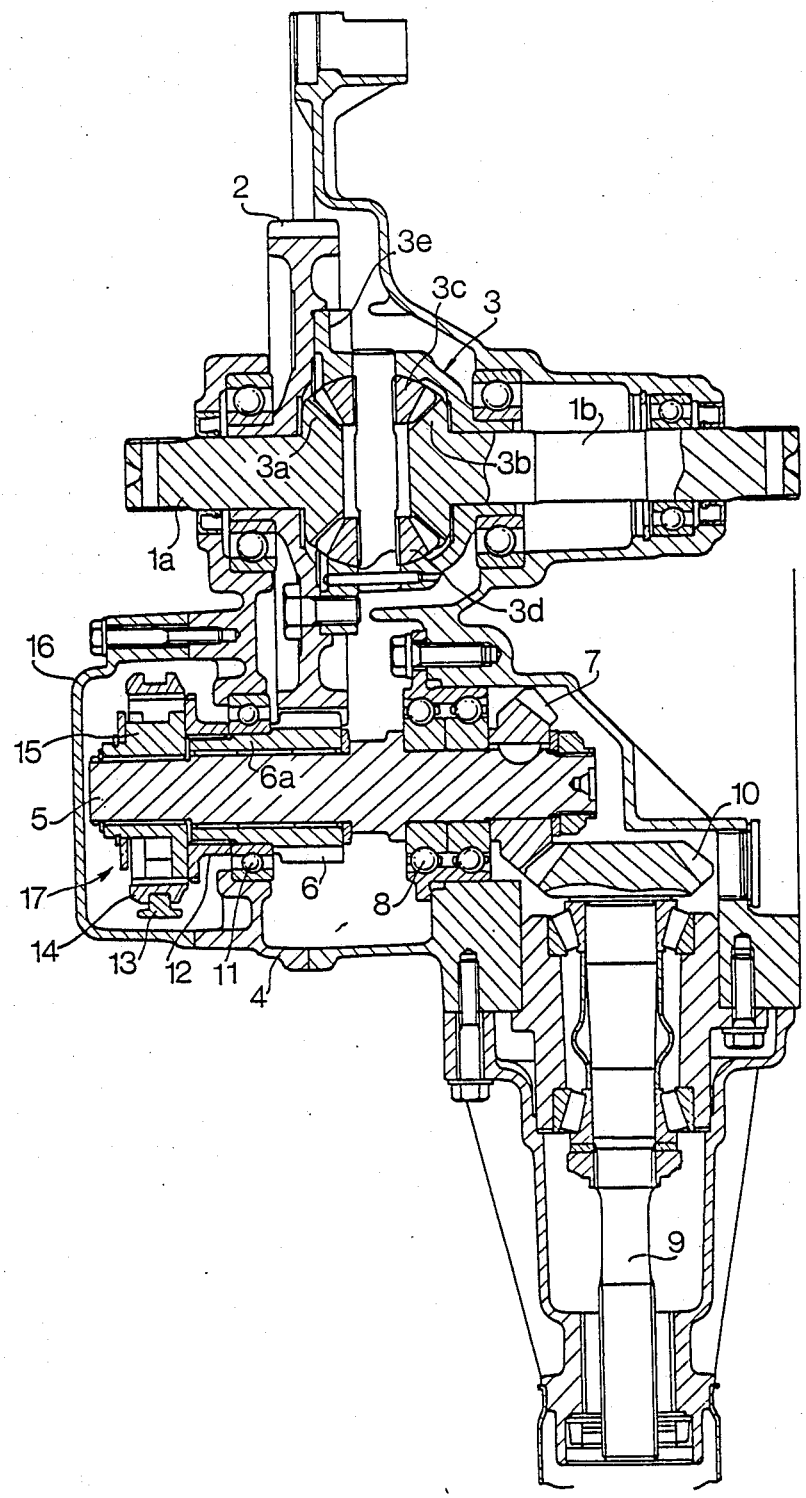

TRANSFER DEVICE FOR A FOUR-WHEEL DRIVE VEHICLE

BACKGROUND OF THE INVENTION

The present invention relates to a system for transmitting the power of an engine to front and rear wheels of a four-wheel drive vehicle and more particularly to an arrangement in a transfer device of the system.

Japanese Utility Model Laid open 61-170747 discloses a power transmitting system having a final reduction gear secured to a case of a differential, front axles to which the power of an engine is transmitted from a transmission through the final reduction gear, a transfer shaft disposed in parallel to the front axles, a transfer gear rotatably mounted on the transfer shaft and in mesh with the final reduction gear, a drive bevel gear secured to the transfer shaft and in mesh with a driven bevel gear of a rear drive shaft which is perpendicularly disposed to the transfer shaft, and a coupling device provided on the transfer shaft to connect the transfer gear with the transfer shaft for transmitting the power to the transfer shaft. The coupling device is disposed between the transfer gear and the axis of the rear drive shaft, and the bearings for supporting the transfer shaft are disposed on both ends thereof. Since the rear drive shaft and the differential are disposed near the center line of the body of the vehicle, with respect to the width thereof, the lengths of the right and left front axles are substantially equal to each other, thereby preventing the vehicle from deviating from a course.

In such a device, there is a problem that the transfer shaft is deflected by the centrifugal force and thrust exerted on the drive bevel gear. Thus, engaging surfaces of the bevel gears are obliquely shifted, generating gear noise.

In addition, the transfer shaft is supported at the ends thereof so that a heavy load consisting of the coupling device, transfer gear and drive bevel gear is exerted on the transfer shaft. Furthermore, a space is formed about the bevel gears, so that oil is accumulated therein. Such a structure having an oil accumulation space causes not only lubrication efficiency in the transmission system to deteriorate, but also increases the weight thereof.

SUMMARY OF THE INVENTION

The object of the present invention is to provide an arrangement of the transfer device for a four-wheel drive vehicle where the above-described disadvantages can be obviated.

According to the present invention, there is provided a transfer device for transmitting power of an engine to driving wheels of a four-wheel drive vehicle, comprising a transfer shaft rotatably mounted in a case by first and second bearings, a transfer gear rotatably mounted on the transfer shaft at a portion between the bearings and engaged with a final reduction gear, a coupling device provided outside the first bearing for engaging the transfer gear with the transfer shaft, a drive bevel gear secured to the transfer shaft at a portion outside the second bearing, and a driven bevel gear engaged with the drive bevel gear, for transmitting the power.

The other objects and features of this invention will become understood from the following description with reference to the accompanying drawing.

BRIEF DESCRIPTION OF DRAWING

The only FIGURE is a sectional view showing a part of a four-wheel drive power transmission system according to the present invention.

DETAILED DESCRIPTION OF THE PREFERRED EMBODIMENT

Referring to the FIGURE, a power transmission system of a four-wheel drive vehicle has a left and a right front axle 1a and 1b, for driving front wheels of the vehicle, to which the output of the transmission is transmitted through a final reduction gear 2 and a differential 3. The final reduction gear 2 is secured to a differential case 3e of the differential 3. Pinion gears 3c and 3d pivotally mounted on the case 3e mesh with bevel gears 3a and 3b which are integrally formed on the left and right axles 1a and 1b, respectively.

A transfer device housed in an extension case 4 has a transfer gear 6 rotatably mounted on a central part of a transfer shaft 5 which is disposed in parallel to the front axles 1a and 1b, and engaged with the final reduction gear 2. The transfer shaft 5 is rotatably supported in the case 4 by a bearing 8 and a bearing 11 outside of transfer gear 6 through a boss (longitudinal extension) 6a of the gear 6. Securely mounted on a right end portion of the transfer shaft 5 is a drive bevel gear 7 at the outside of the bearing 8 in the form of a cantilever. The bevel gear 7 is in mesh with a driven bevel gear 10 formed on a rear drive shaft 9 disposed substantially on a center line with respect to the width of the body of the vehicle.

On a left end portion of the transfer shaft 5, a coupling device 17 is provided in the form of a cantilever, for providing a four wheel drive mode. The coupling device 17 is in the form of a synchromesh device and comprises a clutch gear 12 splined to boss 6a of the transfer gear 6, hub 15 splined to the transfer shaft 5, synchronizer clutch 14 mounted on the hub 15 for selectively engaging with the clutch gear 12, and a shifter 13 for axially shifting the synchronizer clutch 14. When the shifter 13 is operated so as to engage the synchronizer clutch 14 with the gear 12, the rotation of the transfer gear 6 is transmitted to the transfer shaft 5 and further to the rear drive shaft 9.

The extended portion of the transfer shaft 5 outside of the extension case 4 is covered by a case cover 16 attached to the case 4.

In this arranged transfer device, although the transfer shaft 5 is supported not at both ends but only at inner portion, the bearings 8 and 11 are provided adjacent the bevel gear 7 and the coupling device 17 so that the transfer shaft 5 is prevented from deflecting. Since the centrifugal force and thrust do not affect the bevel gears 7 and 10, the engaging surfaces thereof are not shifted in a bias direction, and the transmission of power without gear noise is ensured. Moreover, the load on the transfer shaft can be distributed over the whole length thereof.

From the foregoing, it will be understood that the present invention provides a transfer device for a four-wheel drive vehicle where deflection of the transfer shaft is prevented, and an oil accumulation can be reduced, thereby increasing the lubrication efficiency.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A transfer device for transmitting power of an engine from a final reduction gear of a transmission to driving wheels of a four-wheel drive vehicle, comprising:
   a transfer shaft rotatably mounted in a case by first and second bearings;
   a transfer gear rotatably mounted on the transfer shaft at a portion between the bearings and engaged with said final reduction gear;
   means comprising a coupling device mounted on said transfer shaft outside the first bearing for jointly rotatably engaging the transfer gear with the transfer shaft;
   a drive bevel gear secured to the transfer shaft outside the second bearing; and
   a driven bevel gear engaged with the drive bevel gear, for transmitting the power to the driving wheels.

2. A transfer device for transmitting power of an engine from a final reduction gear of a transmission to driving wheels of a four-wheel drive vehicle, comprising:
   a transfer shaft rotatably mounted in a case by first and second bearings;
   a transfer gear rotatably mounted on the transfer shaft at a portion between the bearings and engaged with said final reduction gear;
   means comprising a coupling device mounted on said transfer shaft outside the first bearing for jointly rotatably engaging the transfer gear with said transfer shaft;
   a drive bevel gear secured to the transfer shaft at a portion outside the second bearing:
   a driven bevel gear engaged with the drive bevel gear, for transmitting the power;
   the first bearing rotatably supports longitudinal extension of the transfer gear; and
   said means comprising the coupling the device for jointly rotatably coupling said extension to the transfer shaft.

3. The transfer device according to claim 1, wherein said drive bevel gear and said coupling device are mounted on opposite ends of said transfer shaft with said bearings located therebetween.

4. A transfer device for transmitting power of an engine from a final reduction gear of a transmission to driving wheels of a four-wheel drive vehicle, comprising:
   a transfer shaft rotatably mounted in a case by first and second bearings;
   a transfer gear rotatably mounted on said transfer shaft between said first and second bearings and meshed with said final reduction gear at a position between said bearings;
   a drive shaft perpendicularly coupled with said transfer shaft to transmit said power to the driving wheels of said four wheel drive vehicle;
   means comprising a coupling device mounted on said transfer shaft outside said first bearing for jointly rotatably engaging said transfer gear with said transfer shaft;
   a drive bevel gear on an end of said transfer shaft at a position outside said second bearing in said case; and
   a driven bevel gear mounted on an end of said drive shaft and being perpendicularly meshed with said drive bevel gear so as to transmit said power to said driving wheels.

5. The transfer device according to claim 4, wherein said first bearing rotatably supports a longitudinal extension of said transfer gear, and
   said means comprising said coupling device is for drivingly coupling said extension to said transfer shaft.

* * * * *